(12) United States Patent
Couasnon (10) Patent No.: US 6,371,558 B1
(45) Date of Patent: Apr. 16, 2002

(54) FOLD FLAT VEHICLE SEAT

(75) Inventor: Christian Couasnon, Troy, MI (US)

(73) Assignee: Bertrand Faure Components Ltd., Mississauga (CA)

( * ) Notice: Subject to any disclaimer, the term of this patent is extended or adjusted under 35 U.S.C. 154(b) by 0 days.

(21) Appl. No.: 09/576,244

(22) Filed: May 24, 2000

Related U.S. Application Data (60) Provisional application No. 60/159,456, filed on Oct. 14, 1999.

(51) Int. Cl.$^7$ ................................................. B60N 2/02
(52) U.S. Cl. ..................................... 297/378.1; 297/340
(58) Field of Search ........................... 297/378.12, 340, 297/378.1, 341, 342; 296/65.16, 65.01

(56) References Cited

U.S. PATENT DOCUMENTS

| | | | |
|---|---|---|---|
| 3,931,996 A | * | 1/1976 | Yoshimura |
| 5,454,624 A | * | 10/1995 | Anglade et al. |
| 5,904,404 A | * | 5/1999 | McCulloch et al. |
| 6,183,033 B1 | * | 2/2001 | Arai et al. |

* cited by examiner

Primary Examiner—Milton Nelson, Jr.
(74) Attorney, Agent, or Firm—Patrick J. Hofbauer (57) ABSTRACT

A fold flat vehicle seat comprises a movable track member slidably engaging a fixed track member. A seat assembly is mounted thereon for longitudinal sliding movement of the seat assembly relative to the fixed track member. A track lock is operatively interconnected between the movable and fixed track members and movable between a locked configuration whereat the movable track member is precluded from moving longitudinally relative to the fixed track member and a released configuration whereat the movable track member is permitted to move longitudinally relative to the fixed track member. The seat assembly includes a seat cushion member mounted on the movable track member and a seatback member mounted on the seat cushion member for forward folding about a seatback pivot axis between a substantially upright occupiable position and a substantially horizontal load supporting position. A seatback latch is operatively engaged between the seatback member and the seat cushion member to selectively control the forward folding of the seatback member. A spring biases the seatback member toward the substantially horizontal load supporting position. A link arm is provided for causing rearward longitudinal movement of the seatback member relative to the fixed track member to a predetermined longitudinal position as the seatback member is forwardly folded about the seatback pivot axis from the upright occupiable position to the substantially horizontal load supporting position when the track lock is in the released configuration. The link arm is operatively interconnected between the seatback member and the fixed track member.

22 Claims, 11 Drawing Sheets

FOLD FLAT VEHICLE SEAT

RELATED APPLICATIONS

This application claims the benefit of U.S. Provisional Patent Application Serial No. 60/159,456, filed Oct. 14, 1999.

FIELD OF THE INVENTION

The present invention relates to vehicle seats that fold flat to a substantially horizontal load supporting position and more particularly to such vehicle seats that move to such a substantially horizontal load supporting position as the seatback member is being forwardly folded over the seat cushion member.

BACKGROUND OF THE INVENTION

Multi-seat vehicles, such as vans, minivans, sport utility vehicles, and the like the, typically have middle (second row) and rear (third row) vehicles seats that are placed rearwardly of the driver's and front passenger's (first row) vehicle seats. The second and third row seats are selectively removable and replaceable through a large rear or side door in order to ready the vehicle for carrying cargo. Removal and replacement of these vehicle seats tends to be somewhat difficult and requires a considerable amount of effort on the part of the user, especially with respect to the middle vehicle seat.

To overcome this problem and so as to maximize cargo carrying capabilities, many second and third row seats, and even some first row passenger seats, are configurable from an upright occupiable position to a substantially horizontal load supporting position, whereat the back surface of the seatback acts as a load supporting surface, by means of forwardly folding the seatback member over the seat cushion member.

A significant problem encountered during the forward folding of a seatback member over the seat cushion member is that of interference between the headrest of the seatback member being forwardly folded with a part of the vehicle's interior disposed immediately in front of it. For instance, a front passenger seat headrest might hit the dashboard upon forward folding of its seatback and a second row seat, or a third row seat, might hit the rear of the seatback disposed immediately in front of it. Such interference precludes the seatback member from forthwith reaching its fully forwardly folded position, which is unacceptable. Thus, in the prior art, in order to permit the seatback member to reach its fully forwardly folded position upon encountering such interference, it is necessary for the user to manually manipulate the seat cushion of the seat assembly being folded, and possibly various latching mechanisms associated with the assembly on the track slides on which the seat assembly rests, to a longitudinal position whereat the headrest of the seatback member clears the dashboard or seatback immediately in front of it. Such additional manual manipulation is inconvenient, time-consuming, and unnecessary. Additionally, a person may forget to move, or even forego moving, the vehicle seat assembly to a longitudinal position whereat it clears the object in front of it, thus potentially resulting in damage to either the headrest of the seatback being folded or to the object it impacts.

Another problem with vehicle seat assemblies that fold from an upright occupiable position to a substantially horizontal load supporting position whereat the back surface of the seatback acts as a load supporting surface, is that there tends to be a gap between longitudinally adjacent seats. Such gaps tends to permit objects to fall between longitudinally adjacent seats, or to become caught between them during loading. Such gaps are undesirable, and accordingly should be minimized, or even be made nonexistent.

It is an object of the present invention to provide a fold flat vehicle seat that is designed to automatically clear the part of the vehicle's interior disposed immediately in front of it when the seatback member is forwardly folded from an upright occupiable position to a substantially horizontal load supporting position, without the need for a user to re-adjust the longitudinal position of the seat assembly within the vehicle.

It is another object of the present invention to provide a fold flat vehicle seat that moves to a predetermined longitudinal position within the vehicle as the seatback member is being forwardly folded from an upright occupiable position to a substantially horizontal load supporting position.

It is yet another object of the present invention to provide a fold flat vehicle seat that moves to a predetermined longitudinal position within the vehicle as a result of the seatback member being forwardly folded from an upright occupiable position to a substantially horizontal load supporting position.

It is still another object of the present invention to provide a fold flat vehicle seat that moves to a predetermined longitudinal position within the vehicle as the seatback member is being forwardly folded from an upright occupiable position to a substantially horizontal load supporting position, through a single manipulation of a seatback latch.

It is a further object of the present invention to provide a fold flat vehicle seat that moves to a predetermined longitudinal position within the vehicle as the seatback member is being forwardly folded from an upright occupiable position to a substantially horizontal load supporting position, wherein any significant gap existing between longitudinally adjacent seats is minimized or even nonexistent.

It is yet a further object of the present invention to provide a fold flat vehicle seat that moves to a predetermined longitudinal position as the seatback member is being forwardly folded from an upright occupiable position to a substantially horizontal load supporting position, which vehicle seat is inexpensive to manufacture.

It is yet a further object of the present invention to provide a fold flat vehicle seat that moves to a predetermined longitudinal position as the seatback member is being forwardly folded from an upright occupiable position to a substantially horizontal load supporting position, which vehicle seat is to simple and straightforward in its design and manufacture.

SUMMARY OF THE INVENTION

In accordance with the present invention there is disclosed a fold flat vehicle seat comprising a movable track member slidably engaging a fixed track member and having a seat assembly mounted thereon for longitudinal sliding movement of the seat assembly relative to the fixed track member along a longitudinal axis. A track lock means is operatively interconnected between the movable and fixed track members and movable between a locked configuration whereat the movable track member is precluded from moving longitudinally relative to the fixed track member and a released configuration whereat the movable track member is permitted to move longitudinally relative to the fixed track member. The seat assembly includes a seat cushion member mounted on the movable track member and a seatback member mounted on the seat cushion member for forward folding about a seatback pivot axis between a substantially upright occupiable position and a substantially horizontal load supporting position. A seatback member latch means is operatively engaged between the seatback member and the seat cushion member to selectively control the forward folding of the seatback member. A biasing means is included for biasing the seatback member toward the substantially horizontal load supporting position. A link means is provided for causing rearward longitudinal movement of the seatback member relative to the fixed track member to a predetermined longitudinal position as the seatback member is forwardly folded about the seatback pivot axis from the upright occupiable position to the substantially horizontal load supporting position when the track lock means is in the released configuration. The link means is operatively interconnected between the seatback member and the fixed track member.

Other advantages, features and characteristics of the present invention, as well as methods of operation and functions of the related elements of the structure, and the combination of parts and economies of manufacture, will become more apparent upon consideration of the following detailed description and the appended claims with reference to the accompanying drawings, the latter of which is briefly described hereinbelow.

DETAILED DESCRIPTION OF A PREFERRED EMBODIMENT

Reference will now be made to FIGS. 1 through 7, which show a preferred embodiment of the fold flat vehicle seat, as indicated by the general reference numeral 20, according to the present invention. The fold flat vehicle seat 20 has an outboard side, as indicated by the general reference numeral 21o in FIG. 2, and an inboard side, as indicated by the general reference numeral 21i in FIG. 2, and may be installed in a vehicle 22 as, for example, a second row seat, as specifically illustrated in FIG. 1. It will be apparent to those skilled in the art that the fold flat vehicle seat 20 could be readily adapted with little or no significant modification, to be utilized in a vehicle 22 as a first row seat 20', or as a third row seat 20", while exhibiting the same degree of utility exhibited in its illustrated positioning as a second row seat 20. However, for the purposes of simplicity, the fold flat vehicle seat of the preferred embodiment described and illustrated herein will be described in the context of its positioning within the vehicle as a second row fold flat vehicle seat 20. Irrespective of its row position within the vehicle 22, the fold flat vehicle seat 20 is installable in a vehicle 22 such as the minivan shown in FIG. 1, so as to be either permanently installed within the vehicle 22, or installed in readily removable and replaceable relation within the vehicle 22, both of which modes of installation are well-known in the automotive arts. For ease of illustration, the preferred embodiment 20, is shown in the form of a permanent installation.

Figure 1:
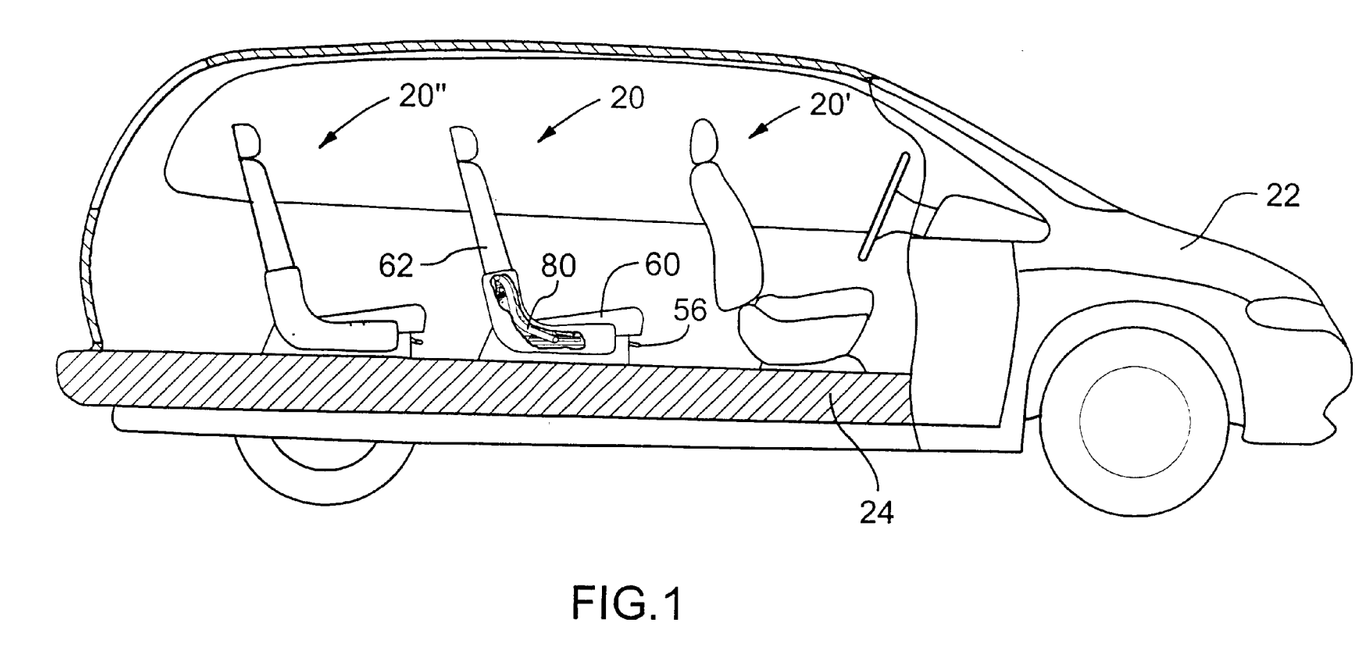
FIG. 1 is a side elevational view of a preferred embodiment fold flat vehicle seat according to the present invention, installed in a vehicle as the passenger seat in the second row position, with a rear portion of the vehicle centrally sectioned for the sake of clarity.
Figure 2:
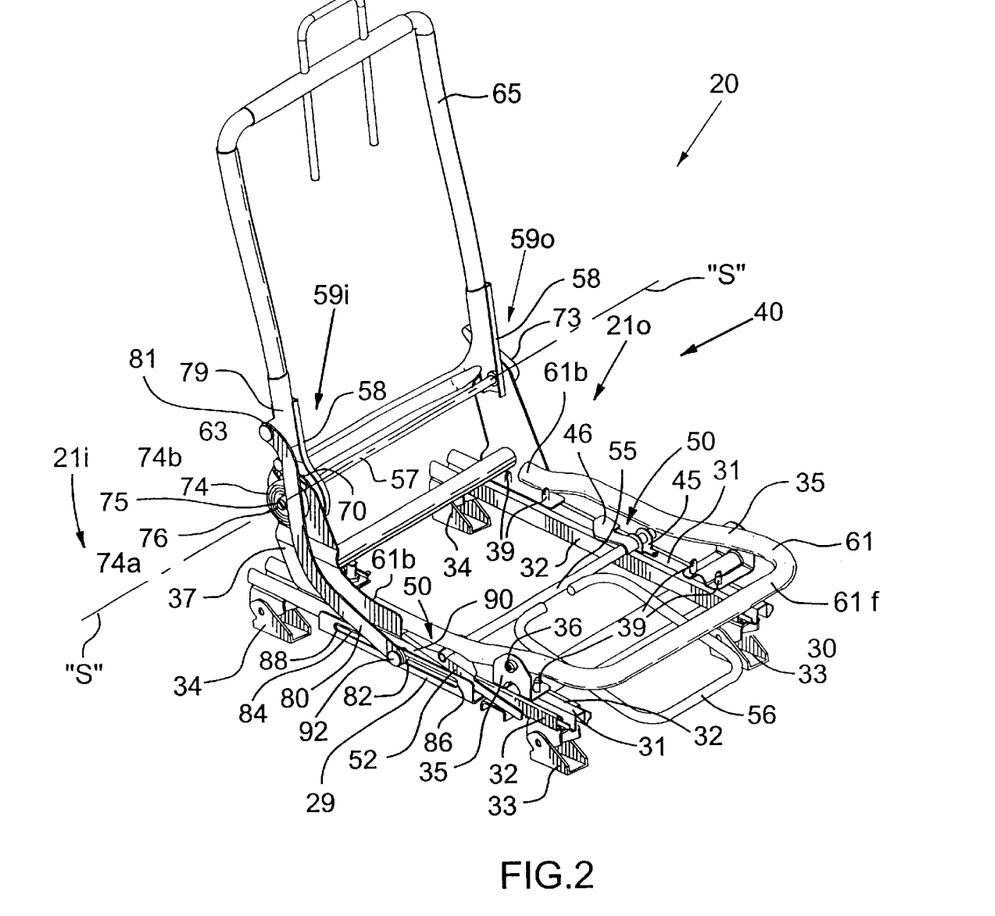
FIG. 2 is a perspective view from the front right of the preferred embodiment fold flat vehicle seat illustrated in FIG. 1, with the seatback member in a substantially upright occupiable position, and showing the frame portions and working mechanisms of the vehicle seat with the fabric and foam cushioning removed for the sake of clarity.
Figure 3:
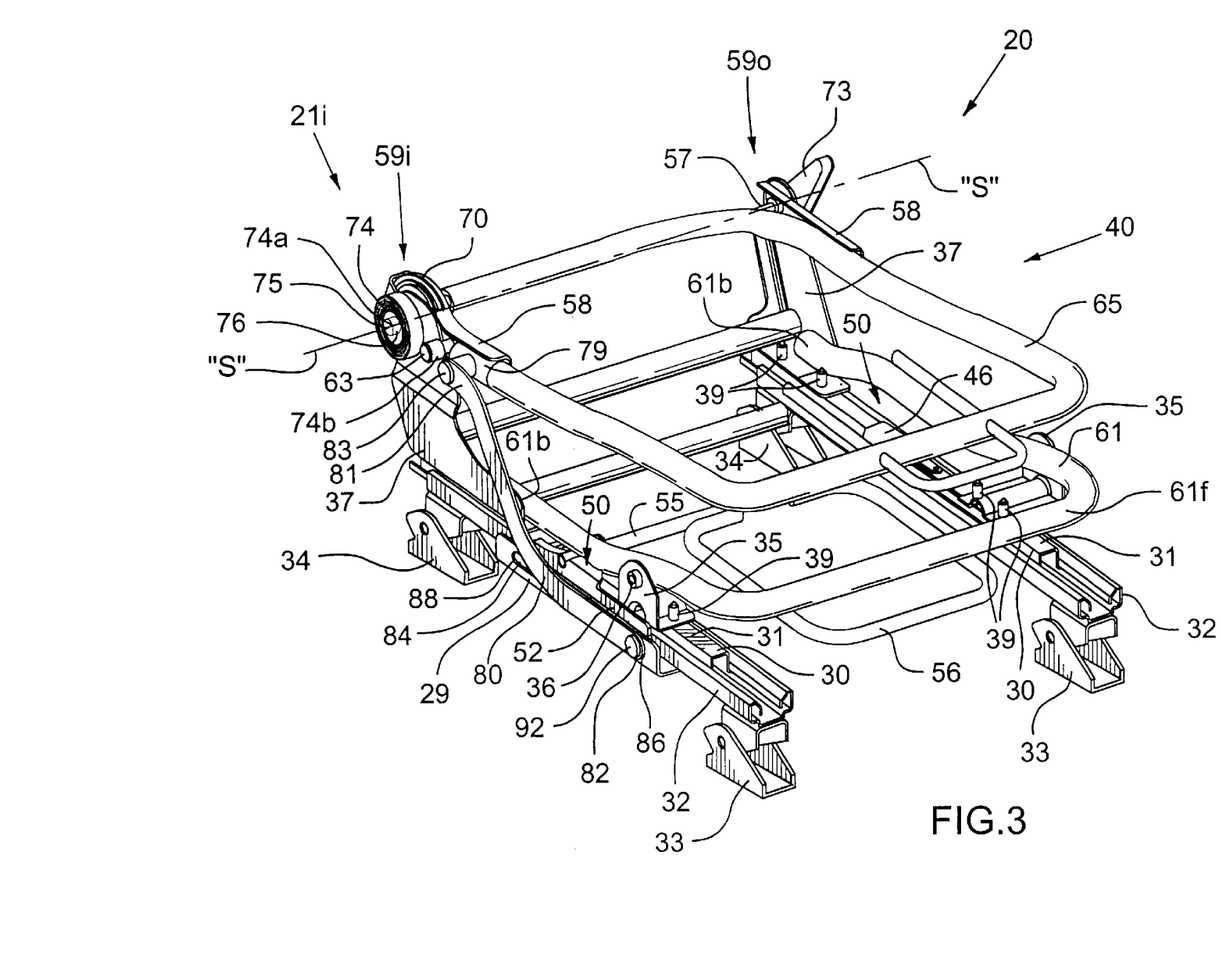
FIG. 3 is a perspective view similar to FIG. 2, with the seatback member in a substantially horizontal load supporting position.

Further, the fold flat vehicle seat 20 is a single occupant seat designed for installation on the driver's side of the vehicle 22, with a release handle 73 being mounted on the outboard side (left-hand side) of the vehicle seat 20, as is apparent from FIGS. 1, 2 and 3. Equivalently, the fold flat vehicle seat 20 can be readily adapted for installation on the passenger's side of the vehicle 22, wherein the release handle 73 would be preferably mounted on the outboard side (right-hand side) of the vehicle seat 20. Also, the fold flat vehicle seat could be of the bench-type (multiple occupant) seat. Such minor moving of components and changes in dimension for different applications are a matter of routine design variation within the routine skill of persons skilled in the relevant art.

Figure 8A:
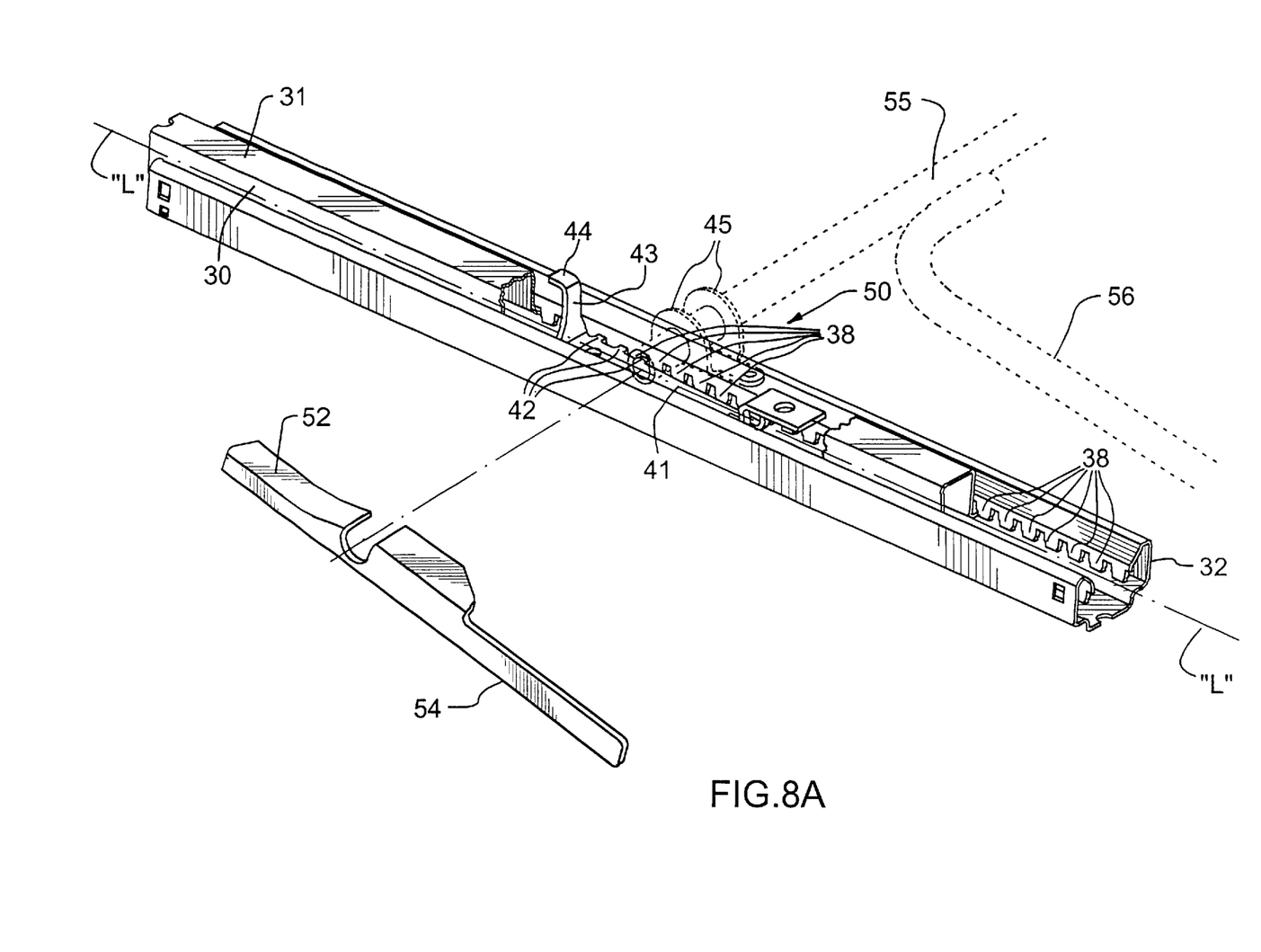
FIG. 8A is a perspective cut-away view from the front right of a seat track assembly used in the preferred embodiment fold flat vehicle seat illustrated in FIGS. 1 through 7, with the seat track assembly in a locked configuration; and, FIG. 8B is a perspective view similar to FIG. 8A, but with the seat track assembly in a locked configuration.
Figure 8B:
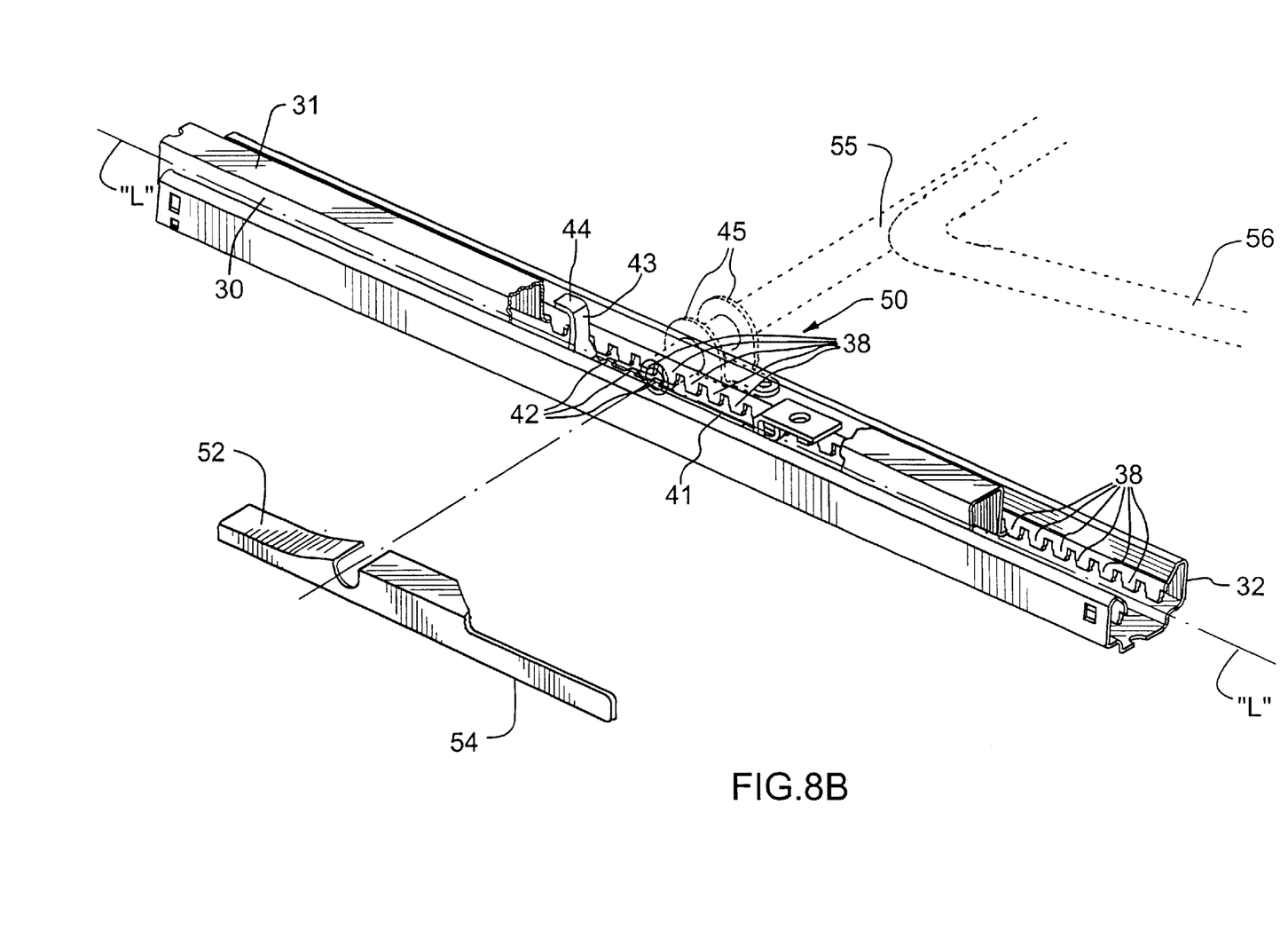

As can be best seen in FIGS. 2 and 3, the fold flat vehicle seat 20 comprises an outboard movable track member 30 and a fixed track member 32, together with an inboard movable track member 30 and a fixed track member 32, with each of the inboard and outboard moveable track members 30,30 slidably engaging the respective one of the inboard and outboard fixed track members 32,32, according to known practice. FIGS. 8A and 8B specifically show the inboard movable 30 and fixed 32 track members, with one part "exploded" for the sake of clarity. The outboard movable track member 30 and fixed track member 32, per se, are essentially the same as the inboard movable track member 30 and fixed track member 32, except for the addition of a guide bracket 29 secured to the inboard fixed track member 32, as described more fully below. The guide bracket is not shown in FIGS. 8A and 8B for the sake of clarity. Accordingly, the following discussion of the movable and fixed track members applies to both the inboard and outboard movable 30 and fixed 32 track members, except as otherwise noted. For the sake of convenience, like reference numerals have been used for both the inboard and outboard movable 30 and fixed 32 track members.

As can be best seen in FIGS. 6, 6A, 6B, 8A, and 8B, the moveable track member 30 is of a known design and slidably engaging a fixed track member 32 for longitudinal sliding movement of the moveable track member 30 relative to the fixed track member 32 along a longitudinal axis indicated by reference letter "L". The fixed track member 32 is secured to the floor 24 of the vehicle 22 in a conventional manner by means of two front mounting brackets 33 and two rear mounting brackets 34. Each of the front 33 and rear 34 mounting brackets is, in turn, conventionally secured to the floor 24 of the vehicle 22 by means of welding or threaded fasteners (not shown). The moveable track member 30 (shown in two uneven broken sections in FIGS. 8A and 8B) is conventionally disposed in supported relation on the fixed track member 32 so as to present a substantially horizontal top span 31.

A seat assembly, as indicated by the general reference numeral 40, includes a seat cushion member 60 having an internal tubular structural member 61. The seat assembly 40 is mounted on the substantially horizontal surface 31 of the movable track member 30 by means of inboard and outboard forward mounting brackets 35,35 secured to the tubular structural member 61 of the seat cushion member 60, adjacent its front end 61f, by means of stake pins 36, and by means of inboard and outboard large rearward mounting brackets 37,37 secured to the tubular structural member 61 of the seat cushion member 60, adjacent its rear ends 61b,61b, by means of, for example, welding. The forward mounting brackets 35,35 and the large rearward mounting brackets 37,37 are each secured to the substantially horizontal top span 31 of the movable track member 30 by means of, for example, stake pins 39. In this manner, the seat assembly 40 is secured to the moveable track members 30,30 for longitudinal sliding movement of the seat assembly 40, along with the moveable track member 30, relative to the fixed track members 32,32 along the longitudinal axis "L".

A guide slot 84 is associated with the fixed track member 32. In the preferred embodiment illustrated, the guide slot 84 is disposed in the guide bracket 29, which bracket 29 is rigidly attached to the fixed track member 32. The guide slot 84 has a forward end 86 and a rearward end 88, and is longitudinally disposed adjacent the fixed bottom track member 30, so as to be substantially parallel to the longitudinal axis "L".

A track lock means comprises at least one track lock mechanism, and in the preferred embodiment illustrated, comprises two substantially identical track lock mechanisms, each designated by the general reference numeral 50. An outboard track lock mechanism 50 is operatively interconnected between the outboard moveable track member 30 and the outboard fixed track member 32, and an inboard track lock mechanism 50 is operatively interconnected between the inboard moveable track member 30 and the inboard fixed track member 32. The structure and operation of the outboard and inboard track lock mechanisms 50 are known in the art and are the same, except as noted, and accordingly, the subsequent discussion will generally refer to one track lock mechanism 50 only. The location of each of the outboard and inboard track lock mechanisms 50,50 are separately indicated in FIGS. 2 and 3, and the structure of the inboard track lock mechanism 50 is specifically shown in detail in FIGS. 8A and 8B.

The track lock mechanism 50 is of conventional design, and, as shown in the figures, preferably comprises a pawl member 41 made of a spring metal material and having six laterally projecting teeth 42 (only three of which are viewable). The pawl member 41 is mounted on the movable track member 30 between the movable track member 30 and the fixed track member 32 by means of a threaded fastener (not shown), or alternatively, a stake pin or a rivet extending through an aperture 41a adjacent an anchored forward end of the pawl member 41, so as to threadibly engage a cooperating threaded aperture (not shown) in the substantially horizontal top span 31 of the movable track member 30. The pawl member 41 has at its opposite free (rearward) end a vertically disposed actuator arm 43 terminating in a horizontally disposed head portion 44, which head portion 44 extends above the level of the top span 31 of the movable track member 30. A "towel bar" type of manually manipulatable release handle 56 is operatively mounted on the top span 31 of the movable track member 30 by means of a mounting shaft 55 pivotally mounted at each of its ends in one of two bifurcated mounting flanges 45 secured, one each, on the movable track members 30, by means of welding or suitable fasteners. Only the right end of the mounting shaft 55 is shown in FIGS. 8A and 8B.

An actuation means 52, which, in the preferred embodiment illustrated, comprises a pivotally mounted actuation member, specifically an actuation lever 52 having a link arm member receiving surface 54, is welded to the mounting shaft 55 for rotation therewith and for contacting engagement with the horizontal head portion 44 of the actuator arm 43 which lies below on the inboard movable track member 30 (shown in FIGS. 8A and 8B). The actuation lever 52 is shown "exploded" in FIGS. 8A and 8B for the sake of clarity. On the outboard movable track member 30 (best seen in FIGS. 2 and 3) is an actuation arm 46 is welded to the mounting shaft 55 for contacting engagement with the horizontal head portion 44 of the actuator arm 43. In this manner, both the inboard track lock mechanism 50 and the outboard track lock mechanism 50 are released concurrently upon rotation of the mounting shaft 55.

The pawl member 41 is moveable between a locked configuration, as can be best seen in FIG. 8A, and a released configuration, as can be best seen in FIG. 8B. In the locked configuration, as is shown in FIGS. 2, 3, 4, 5, 5A, 5B, and 8A, the six teeth 42 on the pawl member 41 engage co-operating teeth 38 disposed on the fixed track member 32, so as to preclude the moveable track member 30 from moving longitudinally relative to the fixed track member 32. In the released configuration, as is shown in FIGS. 6, 6A, 6B, 7, and 8B, the teeth 42 of the pawl member 41 are removed from engagement with the co-operating teeth 38 of the fixed track member 32, thus permitting the moveable track member 30 to move longitudinally relative to the fixed track member 32. In order to manually move the track lock mechanism 50 from its locked configuration to its released configuration, the release handle 56 is manually moved upwardly by a user, as indicated by arrow "I" in FIG. 8B, thereby moving the teeth 42 on the pawl member 41 from engagement with the cooperating teeth 38 on the fixed track member 32, as is shown in FIG. 8A, to disengagement with the cooperating teeth 38, as is shown in FIG. 8B. Automatic unlocking according to an aspect of the present invention is described more fully below.

Figure 4:
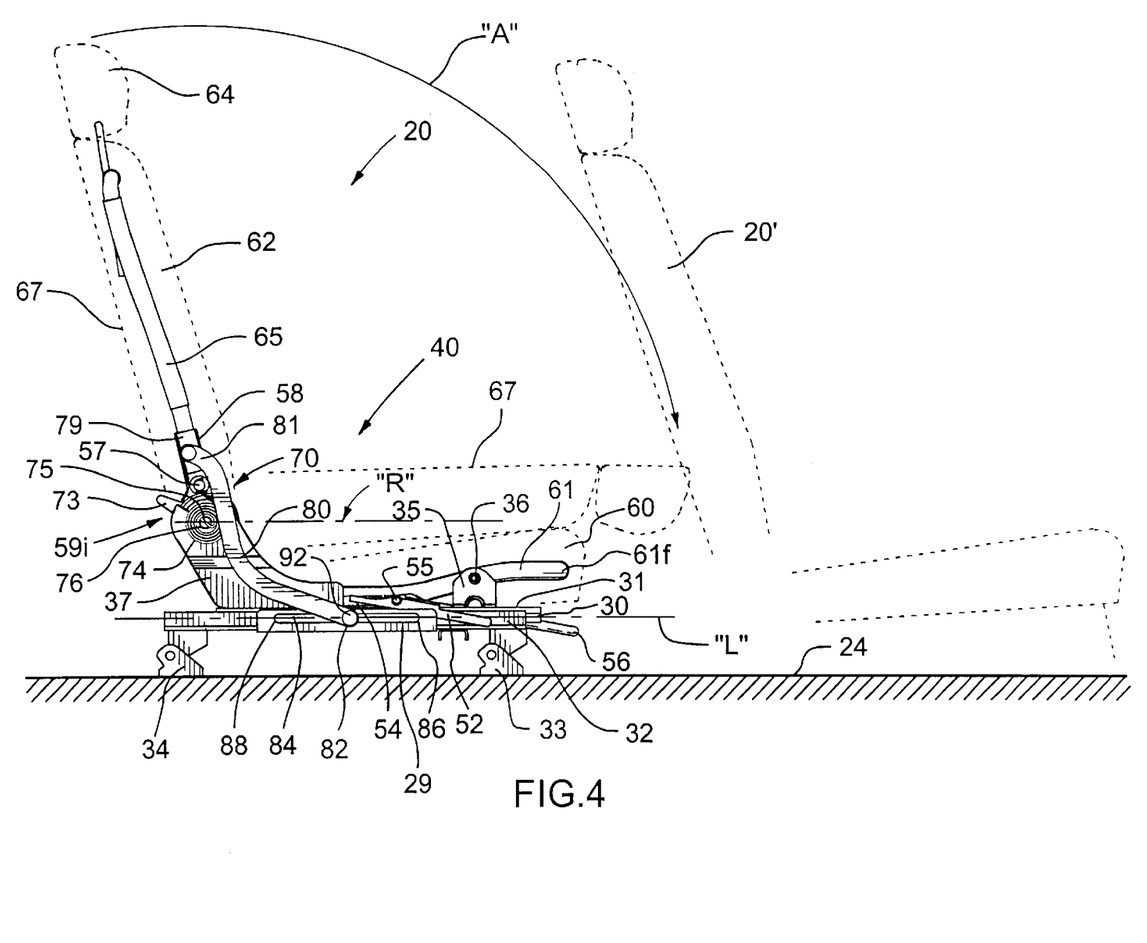
FIG. 4 is a side elevational view of the preferred embodiment fold flat vehicle seat illustrated in FIG. 2, with the seatback member in a substantially upright occupiable position.
Figure 7:
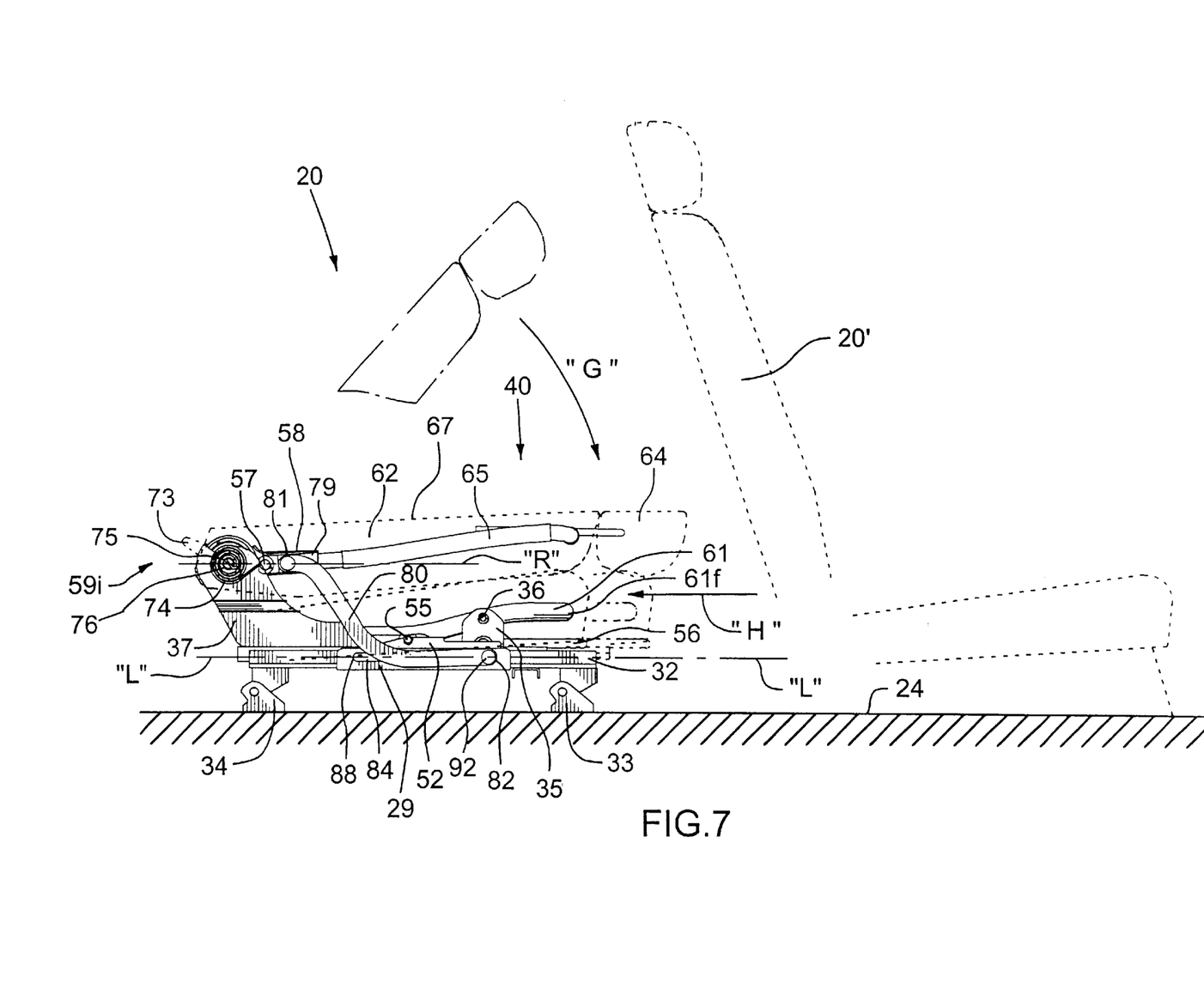
FIG. 7 is a side elevational view similar to FIG. 6, with the seatback member shown in dashed lining in the slightly more advanced forwardly folded position of FIG. 6, and with the seatback member shown in solid lining in its substantially horizontal load supporting position.

A seatback member 62 having an internal tubular structural member 65 and a headrest 64 is mounted on the seat cushion member 60 by means of an inboard vehicle set hinge 59i and an outboard vehicle set hinge 59o. Each of the inboard 59i and the outboard 59o vehicle seat hinges comprises a comprises a respective upper sector plate 58 welded to the tubular structural member 65 of the seatback member 62 pivotally joined by a pivot shaft 57 to a respective one of the large rear mounting brackets 37,37. In this manner, the seatback member 62 is mounted on the seat cushion member 60 for forward folding, as indicated by arrow "A" in FIG. 4, about a seatback pivot axis "S" between a substantially upright occupiable position, as is best seen in FIGS. 2 and 4, and a substantially horizontal load supporting position, as is best seen in FIGS. 3 and 7. When the seatback member 62 is disposed in its substantially horizontal load supporting position, it is ready to receive cargo on the back surface 67 thereof.

A seatback member latch means, as indicated by the general reference numeral 70, is operatively engaged between the seatback member 62 and the seat cushion member 60 to selectively control the forward folding of the seatback member 62 over the seat cushion member 60. As be best seen in FIGS. 2 and 3, the seatback member latch means 70 comprises a seatback member latch mechanism 70 mounted in a known manner in interposed relation between the upper sector plate 58 and the respective large rear mounting bracket 37 of the inboard vehicle set hinge 59i. The manually actuated handle member 73 is operatively mounted on the outboard vehicle set hinge 59o and is connected to the seatback member latch mechanism 70 via the pivot shaft 57, so as to permit manual actuation of the seatback member latch mechanism 70.

A biasing means, comprising a clock spring 74, has one end 74a secured within a slot 75 in a horizontally disposed post 76 extending outwardly from the inboard vehicle seat hinge 59i. The opposite second end 74b of the clock spring 74 engages a horizontal post 63 secured to the tubular structural member 65 of the seatback member 62, so as to bias the seatback member 62 toward its substantially horizontal load supporting position, and preferably all of the way to its substantially horizontal load supporting position. In this manner, once the seatback latch mechanism 70 is released through manual manipulation of handle member 73, the seatback member 62 is automatically pivotally moved forwardly to its substantially horizontal load supporting position.

A link means, comprising a substantially rigid link arm member 80, and having a first end 81 and an opposed second end 82 is operatively interconnected between the seatback member 62 and the fixed track member 32. More specifically, the link arm member 80 is pivotally connected at its first end 81 by means of a pivot pin 83 to the seatback member 62 at a mounting collar 79 securely retained on the tubular structural member 65 at the upper sector plate 58. The first end 81 of the link arm member 80 is pivotally connected to the seatback member 62, as aforesaid, at a level above the seatback pivot axis "S", when the seatback member 62 is in its substantially upright occupiable position.

The link arm member 80 further comprises a roller member 90 mounted in freely rotatable relation on a fixed shaft (not shown) having a head portion 92, so as to be disposed adjacent the second end 82 of the link arm member 80. The roller member 90 is engaged in rolling relation within the longitudinal guide slot 84 for movement along the longitudinal guide slide 84 between an initial position, as can be best seen in FIGS. 2 and 4, and a blocked position, as can be best seen in FIGS. 3, 6, 6A, 6B, and 7, whereat the roller member 90 abuts against the forward end 86 of the guide slot 84, such that the second end 86 of the link arm member 80 is precluded from further forward movement. In this manner, the link arm member 80 is slidably engaged at its second end 82 within the guide slot 84 for movement of the second end 82 of the link arm member 80 along the guide slot 84 between its initial position corresponding to the upright occupiable position of the seatback member 62 and its blocked position coincident with the initiation of the rearward longitudinal movement of the seatback member 62. When the second end 82 of the link arm member 80 moves from its initial position to its blocked position, it moves in a substantially forward longitudinal direction, as indicated by arrow "C" in FIG. 5.

As can be best seen in FIGS. 4 through 7, the track lock mechanism 50 is mounted on the fixed track member 32 such that the actuation lever 52 is disposed adjacent the forward end 86 of the guide slot 84 and also so as to extend slightly rearwardly of the forward end 86 of the guide slot 84. Accordingly, as the roller member 90 approaches the forward end 86 of the guide slot 84, as indicated by arrow "C" in FIG. 5, the roller member 90 engagingly contacts the actuation lever 52 at its link arm member receiving surface 54, as can be best seen in FIG. 5B, thereby to pivot the 52 about its pivot axis "P" so as to unlock the seat track lock mechanism 50 as more fully described below.

Reference will now be made to FIGS. 4 through 7 to describe the operation all of the vehicle seat 28 according to the present invention. In FIG. 4, the seatback 62 of the vehicle seat 20 is in its upright occupiable configuration. The second end 82 of the link arm member 80 is disposed within the guide slot 84 at a location positioned a distance of several inches from the forward end 86 of the guide slot 84. In order to the fold the seat of forwardly from its substantially upright occupiable position, as shown in dashed lining, to its to substantially horizontal load supporting position, as indicated in ghost outline, as indicated by arrow "A", the release handle 73 is manipulated in the direction of arrow "K" of FIG. 5, thus releasing the seatback member latch mechanism 70. The spring member 74 causes the seatback member 62 to start to fold forwardly, as indicated by arrow "B" in FIG. 5, from its upright occupiable position, as shown in ghost outline, to an unoccupiable first partially folded position.

Figure 5:
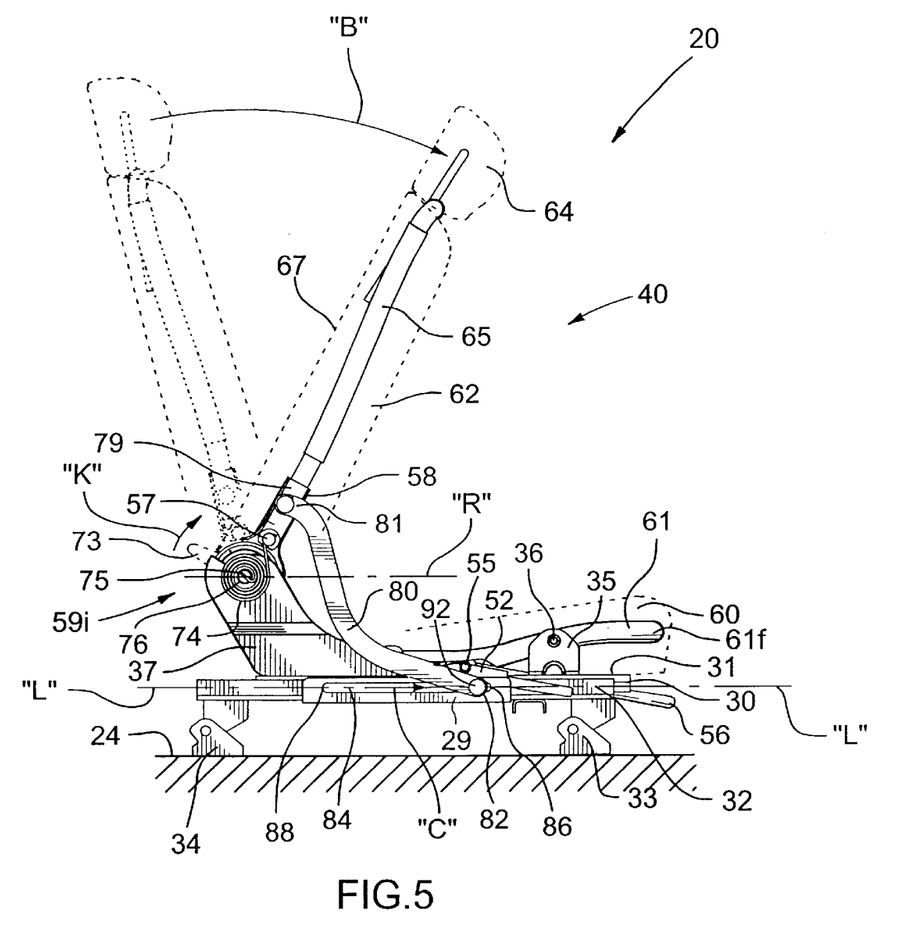
FIG. 5 is a side elevational view similar to FIG. 4, with the seatback member shown in dashed lining in its substantially upright occupiable position, and with the seatback member moved to a first partially forwardly folded position, as shown in solid lining, whereat the track lock mechanism is about to be released.
Figure 5A:
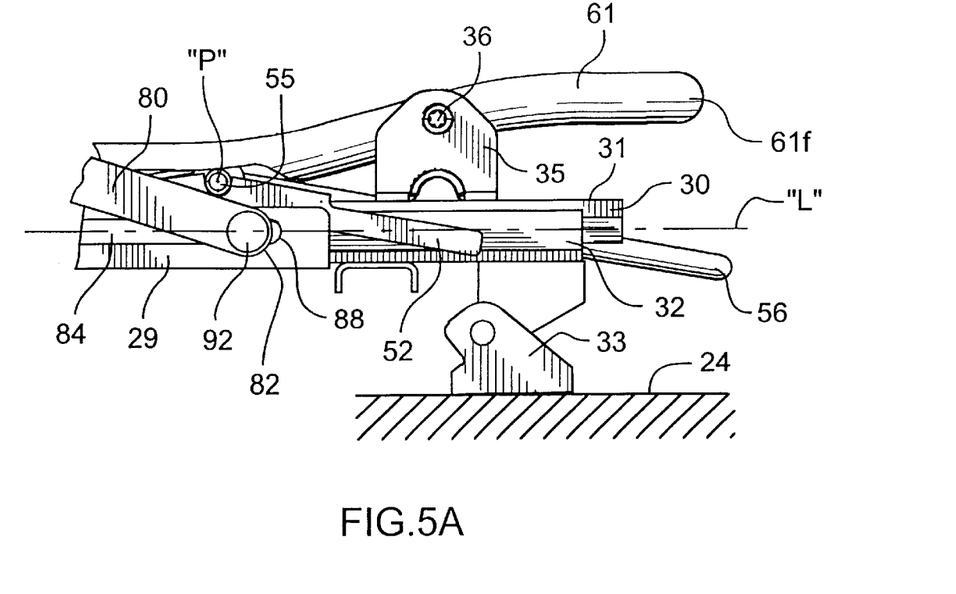
FIG. 5A is an enlarged side elevational view of a portion of FIG. 5.
Figure 5B:
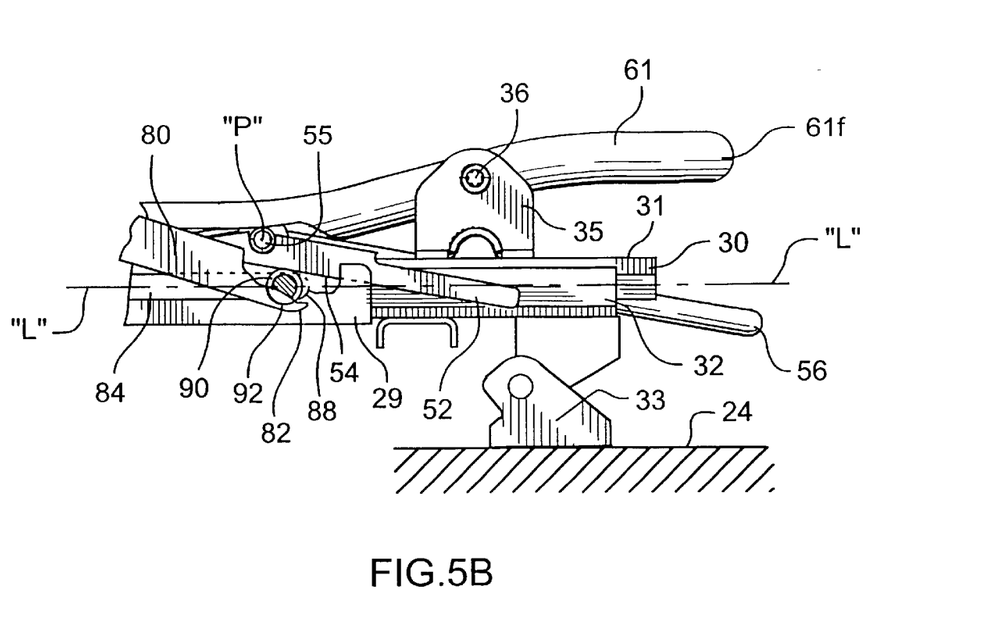
FIG. 5B is an enlarged side elevational view similar to FIG. 5A, with a portion of the link arm and seat track guide rail cut-away for the sake of clarity.

Concurrent with the forward folding of the seatback member 62 from its upright occupiable position to its first partially folded position, the seatback member 62 pushes the link arm member 80 longitudinally forwardly such that the second end 82 of the link arm member 80 moves forwardly along the guide slot 84, as indicated by arrow "C" in FIG. 5, to a position whereat the roller member 90 engagingly contacts the actuation lever 52 at its link arm member receiving surface 54, as can be best seen in FIG. 5B.

Figure 6:
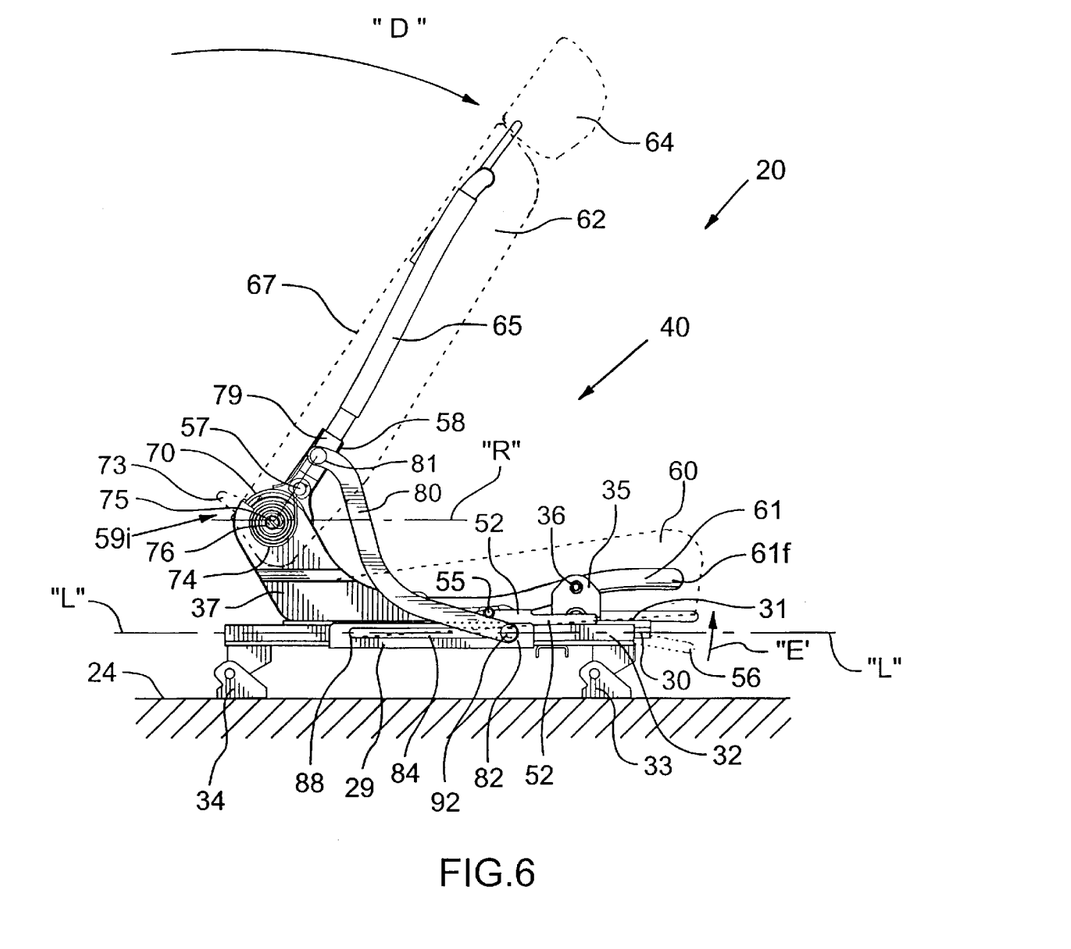
FIG. 6 is a side elevational view similar to FIG. 5, with the seatback member shown in a slightly more advanced second partially forwardly folded position, whereat the track lock mechanism is fully released.

As is illustrated in FIG. 6, the seatback member 62 continues to fold forwardly to a more advanced unoccupiable second partially folded position, as indicated by arrow "D". During this transition, the second end 82 of the link arm member 80 continues to move forwardly along the guide slot 84, until it reaches the forward end 86 of the guide slot 84, as can be best seen in FIG. 6B. Such movement of the roller member 90 causes the actuation lever 52 to be pivoted counter-clockwise about pivot axis "P", as indicated by arrow "F" in FIG. 6B, from a locking position as indicated in solid lining in FIGS. 5A and 5B, and in dashed lining in FIGS. 6A and 6B, to a releasing position as indicated in solid lining in FIGS. 5A and 6B. The pivoting movement of the actuation lever 52 causes the vertically disposed actuator arm 43 to be pushed downwardly, as indicated by arrow "J" in FIG. 8B, thus causing the pawl member 41 to move from its locked configuration, as is illustrated in FIG. 8A, to its unlocked configuration, as is illustrated in FIG. 8B. Accordingly, the locking position of the actuation lever 52 corresponds to the locked configuration of the track lock mechanism 50, as is illustrated in FIG. 8A, and the unlocking position of the actuation lever 52 corresponds to the unlocked configuration of the track lock mechanism 50, as is illustrated in FIG. 8B.

In the preferred embodiment illustrated, each lock mechanism 50 is simultaneously moved from its locked configuration to its released configuration immediately before the initiation of the rearward longitudinal movement of the seatback member 62, so as to allow for such rearward movement of the seatback member 62 and the seat cushion member 60 attached thereto. However, the unlocking of the lock mechanisms 50 can occur earlier, if desired, by simply moving the actuation lever 52 farther rearward from the forward end 86 of the guide slot 84.

Figure 6A:
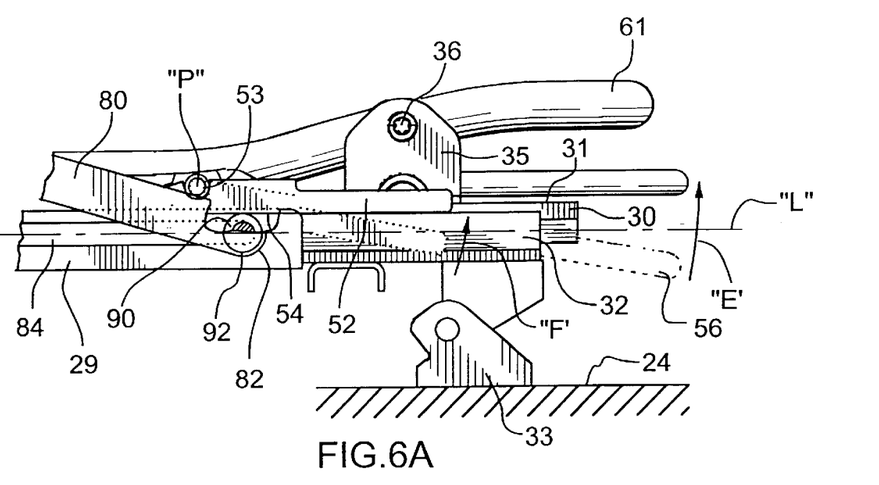
FIG. 6A is an enlarged side elevational view of a portion of FIG. 6.
Figure 6B:
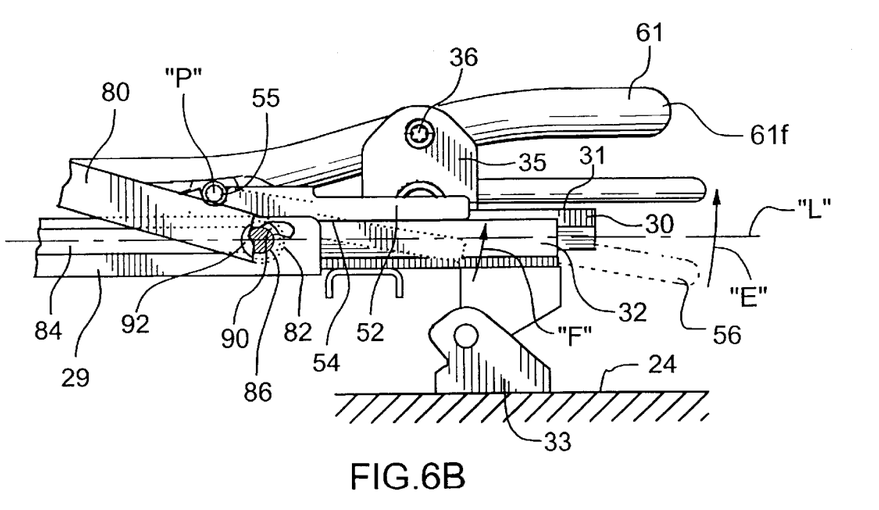
FIG. 6B is an enlarged side elevational view similar to FIG. 6A, with a portion of the link arm and seat track guide rail cut-away for the sake of clarity.

Also, as can be best seen in FIGS. 6A and 6B, the pivoting of the actuation lever 52 causes concurrent pivoting of the mounting shaft 55, thereby also lifting the "towel bar" track release handle 56, as indicated by arrow "E" in each of FIGS. 6A and 6B. Of course, lifting of the "towel bar" track release handle 56 by means of manual manipulation would be an alternative mode of releasing the track lock mechanisms 50.

After release of the track lock mechanism 50, and is illustrated in FIG. 7, the spring member 74 continues to forwardly fold the seatback member 62 about the seatback pivot axis "S", from the second partially folded position as shown in ghost outline in FIG. 7, to its substantially horizontal load supporting position, as indicated by arrow "G" in FIG. 7. During this final forward folding of the seatback member 62 to its substantially horizontal load supporting position, the second end 82 of the link arm member 80 remains it its blocked position at the forward end 88 of the guide slot 84. Accordingly, the link arm member 80 resists further forward longitudinal movement of the seatback member 62. Moreover, the first end 81 of the link arm member 80 acts as a fulcrum to the seatback 62, to thereby cause the bottom portion of the seatback 62 disposed below the fulcrum point at the first end 81 of the link arm member 80, to move longitudinally rearwardly. The seatback 62 correspondingly pushes rearwardly on the seat cushion member 60, by reason of its pivotal mounting on the seat cushion member 60. Since the track lock mechanisms 50,50 are both unlocked, the seat assembly 40, or in other words bot the seat cushion member 60 and the seatback member 62, is caused to move together in a rearward longitudinal direction along the fixed track member 32. In this manner, the link arm member 80 causes rearward longitudinal movement of the seatback member 62 relative to the fixed track member 32, as indicated by arrow "H" in FIGS. 6 and 7, to a predetermined longitudinal position, as the seatback member 62 continues to be forwardly folded about the seatback pivot axis "S" from the second partially folded position, as shown in FIG. 6 and shown in ghost outline in FIG. 7, to its substantially horizontal load supporting position, as shown in solid lining in FIG. 7. It will be appreciated from a comparison of FIGS. 4 and 7, that the seatback member 62 has, by reason of such movement in the direction of arrow "H", been moved sufficiently longitudinally rearwardly, such that the headrest 64 of the seatback member 62 does not in FIG. 7 impact against the rear of the first row seat 20' in front of it (shown in dashed lining in FIGS. 4 and 7), as it would otherwise, as seen in FIG. 4, but for such longitudinal rearward movement. In other words, the vehicle seatback member 62 pre-adjusts its longitudinal position within the vehicle 22 such that the headrest 64 does not hit the part of the vehicle's interior disposed immediately in front of the vehicle seat 20, namely the first row seat 20', when the seatback member 62 is being forwardly folded from an upright occupiable position to a substantially horizontal load supporting position.

As can be best seen in FIG. 7, when the seatback member 62 is in its substantially horizontal load supporting position, the first end 84 of the linked arm member 80 is disposed at or below the level of a straight reference line "R" passing through the seatback pivot axis and that is also parallel to the longitudinal axis "L". In other words, the first end 84 of the link arm member 80 has passed below the level of the seatback pivot axis "S" so as to have gone below center with respect to horizontal movement of the vehicle seat assembly along the fixed track member 32, which movement is defined along the longitudinal axis "L". Accordingly, any rearwardly directed force on the vehicle seat assembly 40 would tend to push the seatback member 62 even more towards its substantially horizontal load supporting position, thus effectively "locking" the seatback member 62 in that load supporting position without having to use an actual latching mechanism.

Other modifications and alterations may be used in the design and manufacture of the fold flat vehicle seat according to the present invention without departing from the spirit and scope of the accompanying claims. For example, although the vehicle seat 20 is shown and discussed as a second row vehicle seat, it could be readily adapted with little or no significant modification, to be utilized in a vehicle as a first row seat or as a third row seat.

I claim:

1. A fold flat vehicle seat comprising:

a movable track member slidably engaging a fixed track member and having a seat assembly mounted thereon for longitudinal sliding movement of the seat assembly relative to said fixed track member along a longitudinal axis;

a track lock means operatively interconnected between said movable and fixed track members and movable between a locked configuration whereat said movable track member is precluded from moving longitudinally relative to said fixed track member and a released configuration whereat said movable track member is permitted to move longitudinally relative to said fixed track member;

wherein said seat assembly includes a seat cushion member mounted on said movable track member and a seatback member mounted on said seat cushion member for forward folding about a seatback pivot axis between a substantially upright occupiable position and a substantially horizontal load supporting position;

a seatback member latch means operatively engaged between said seatback member and said seat cushion member to selectively control said forward folding of said seatback member;

a biasing means for biasing said seatback member toward said substantially horizontal load supporting position; and, a link means for causing rearward longitudinal movement of said seatback member relative to said fixed track member to a predetermined longitudinal position as said seatback member is forwardly folded about said seatback pivot axis from said upright occupiable position to said substantially horizontal load supporting position when said track lock means is in said released configuration, said link means being operatively interconnected between said seatback member and said fixed track member.

2. The fold flat vehicle seat of claim 1, wherein said link means causes rearward longitudinal movement of the seat assembly relative to said fixed track member to a predetermined longitudinal position as said seatback member is forwardly folded about said seatback pivot axis, as aforesaid.

3. The fold flat vehicle seat of claim 2, wherein said link means comprises a link arm member having first and second opposed ends.

4. The fold flat vehicle seat of claim 3, wherein said link arm member is substantially rigid.

5. The fold flat vehicle seat of claim 4, wherein said link arm member is connected at its first end to said seatback member above said seatback pivot axis when said seatback member is in said substantially upright occupiable position.

6. The fold flat vehicle seat of claim 5, wherein said link arm member is slidably connected at its second end to said fixed track member.

7. The fold flat vehicle seat of claim 6, wherein said link arm member is slidably connected at its second end to said fixed track member, as aforesaid, for movement of said second end between an initial position corresponding to said upright occupiable position of said seatback member and a blocked position coincident with initiation of said rearward longitudinal movement of said seatback member.

8. The fold flat vehicle seat of claim 7, wherein said movement of said seatback member from said upright occupiable position to said substantially horizontal load supporting position also causes said track lock means to move from said locked configuration to said released configuration.

9. The fold flat vehicle seat of claim 8, wherein said track lock means is moved from said locked configuration to said released configuration just before said initiation of said rearward longitudinal movement of said seatback member.

10. The fold flat vehicle seat of claim 9, wherein said second end of said link arm member engagingly contacts an actuation means operatively connected to said track lock means so as to cause said track lock means to be moved from said locked configuration to said released configuration.

11. The fold flat vehicle seat of claim 10, wherein said second end of said link arm member moves from said initial position to said blocked position in a substantially forward longitudinal direction.

12. The fold flat vehicle seat of claim 11, wherein said link arm member is slidably engaged at its second end within a guide slot associated with said fixed track member for movement of said second end along said guide slot between said initial position and said blocked position.

13. The fold flat vehicle seat of claim 12, wherein said guide slot is longitudinally disposed so as to be substantially parallel to said longitudinal axis and has a forward end and a rearward end.

14. The fold flat vehicle seat of claim 13, wherein said second end of said link arm member is disposed at said forward end of said guide slot when said second end of said link arm member is disposed in said blocked position.

15. The fold flat vehicle seat of claim 14, wherein said link arm member is pivotally connected at its first end to said seatback member.

16. The fold flat vehicle seat of claim 15, wherein, when said seatback member is in said substantially horizontal load supporting position, said first end of said link arm member is disposed at the level of a straight reference line passing through said seatback pivot axis and that is parallel to said longitudinal axis.

17. The fold flat vehicle seat of claim 16, wherein said actuation means comprises a pivotally mounted actuation member having a link arm member receiving surface for receiving said second end of said link arm member upon said second end of said link arm member moving from said initial position to said blocked position, as aforesaid.

18. The fold flat vehicle seat of claim 17, wherein said link arm member further comprises a roller member mounted in freely rotatable relation adjacent said second end of said link arm member, which roller member is slidably engaged within said longitudinal guide slot for said movement along said guide slot between said initial position and said blocked position.

19. The fold flat vehicle seat of claim 18, wherein said roller member engagingly contacts said actuation means at said link arm member receiving surface, so as to cause said track lock means to be moved from said locked configuration to said released configuration, as aforesaid.

20. The fold flat vehicle seat of claim 17, wherein said actuation member is disposed adjacent said longitudinal guide slot, between said rearward end and said forward end of said guide slot.

21. The fold flat vehicle seat of claim 20, wherein said biasing means biases said seatback member, as aforesaid, all of the way to said substantially horizontal load supporting position.

22. The fold flat vehicle seat of claim 21, wherein said biasing means comprises a clock spring.

* * * * *